(12) United States Patent
Liu et al.

(10) Patent No.: US 9,774,412 B2
(45) Date of Patent: Sep. 26, 2017

(54) CARRIER SYNCHRONIZATION METHOD, CIRCUIT, AND SYSTEM

(71) Applicant: Huawei Technologies Co., Ltd., Shenzhen (CN)

(72) Inventors: Lianfu Liu, Shenzhen (CN); Jun Ma, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 444 days.

(21) Appl. No.: 14/189,471

(22) Filed: Feb. 25, 2014

(65) Prior Publication Data

US 2014/0177489 A1 Jun. 26, 2014

Related U.S. Application Data

(63) Continuation of application No. PCT/CN2012/075260, filed on May 9, 2012.

(51) Int. Cl.
| | | |
|---|---|---|
| *H04L 5/14* | (2006.01) | |
| *H04J 3/06* | (2006.01) | |
| *H04L 27/00* | (2006.01) | |
| *H04B 7/26* | (2006.01) | |
| *H04L 27/227* | (2006.01) | |

(52) U.S. Cl.
CPC ............ *H04J 3/06* (2013.01); *H04B 7/2643* (2013.01); *H04L 27/0014* (2013.01); *H04L 27/2273* (2013.01); *H04L 2027/0024* (2013.01); *H04L 2027/0048* (2013.01)

(58) Field of Classification Search
CPC ...................................................... H04L 5/14
See application file for complete search history.

(56) References Cited

U.S. PATENT DOCUMENTS

| | | | | |
|---|---|---|---|---|
| 3,778,716 A | * | 12/1973 | Stokes | H04B 7/02 455/20 |
| 4,008,443 A | | 2/1977 | Remy | |
| 4,355,404 A | | 10/1982 | Uzunoglu | |
| 5,115,454 A | * | 5/1992 | Kucar | H04L 27/3827 329/307 |
| 5,420,896 A | * | 5/1995 | Schilling | G01S 5/0036 370/479 |

(Continued)

FOREIGN PATENT DOCUMENTS

| | | |
|---|---|---|
| CN | 102111187 A | 6/2011 |
| EP | 0484914 A2 | 11/1991 |
| JP | H01186171 A | 7/1989 |

OTHER PUBLICATIONS

International Search Report and Written Opinion received in Application No. PCT/CN2012/075260 mailed Jul. 5, 2012, 10 pages.

*Primary Examiner* — Hassan Phillips
*Assistant Examiner* — Prenell Jones
(74) *Attorney, Agent, or Firm* — Slater Matsil, LLP

(57) ABSTRACT

Embodiments of the present invention provide a carrier synchronization method, circuit, and system. The method includes performing n times frequency multiplication on a received signal; performing narrowband filtering at least twice and rectangular wave shaping at least twice on the signal obtained after the n times frequency multiplication; and performing n times frequency division on the signal obtained after the filtering and shaping, to restore a carrier signal. The variable n is a positive integer greater than or equal to 4.

16 Claims, 8 Drawing Sheets

(56) References Cited

U.S. PATENT DOCUMENTS

| | | | |
|---|---|---|---|
| 5,548,619 A | 8/1996 | Horiike et al. | |
| 6,452,948 B1* | 9/2002 | McCallister | H04B 7/2681 370/324 |
| 7,308,242 B2* | 12/2007 | Sorrells | H03C 1/62 455/118 |
| 9,306,276 B2* | 4/2016 | Shi | H01Q 1/243 |
| 2002/0163962 A1* | 11/2002 | Al-Eidan | H04B 1/66 375/240 |
| 2005/0009494 A1* | 1/2005 | Sorrells | H03C 1/62 455/313 |
| 2007/0133495 A1* | 6/2007 | Lee | H04B 1/707 370/342 |
| 2007/0173288 A1* | 7/2007 | Skarby | H01O 1/246 455/561 |
| 2008/0096490 A1* | 4/2008 | Okazaki | H04B 1/403 455/76 |
| 2009/0044231 A1* | 2/2009 | Oh | H03M 13/271 725/62 |
| 2011/0076944 A1* | 3/2011 | Mihota | H04L 27/02 455/41.2 |
| 2012/0302188 A1* | 11/2012 | Sahota | H04B 1/006 455/150.1 |
| 2013/0016024 A1* | 1/2013 | Shi | H01Q 1/243 343/833 |
| 2013/0272450 A1* | 10/2013 | Takeuchi | H04L 27/32 375/308 |
| 2015/0312085 A1* | 10/2015 | Sorrells | H03C 1/62 375/320 |

* cited by examiner

CARRIER SYNCHRONIZATION METHOD, CIRCUIT, AND SYSTEM

This application is a continuation of International Application No. PCT/CN2012/075260, filed on May 9, 2012, which is hereby incorporated by reference in its entirety.

TECHNICAL FIELD

The present invention relates to communications technologies and, in particular embodiments, to a carrier synchronization method, circuit, and system.

BACKGROUND

In wireless network applications, downloading of data, multimedia files and so on gradually becomes the mainstream of the applications, which results in a trend of obvious asymmetry in upstream and downstream communication services. Therefore, if a frequency division duplexing (FDD) transmission mode is adopted, a utilization rate of an upstream communication spectrum is low, and therefore, a time division duplexing (TDD) transmission mode is generated.

A TDD system uses a timeslot with a fixed width, upstream and downstream communication transmission uses a same frequency band, and the number of timeslots is assigned according to a service requirement of upstream communication or downstream communication; if there are a large number of services in the downstream communication, more timeslots is assigned for the downstream communication, and if there are a large number of services in the upstream communication, more timeslots is assigned for the upstream communication. A timeslot width of the TDD system corresponds to a TDD frame which is formed by a TDD timeslot guard interval and a valid payload. The timeslot guard interval includes signal delay such as a radio frequency circuit delay, carrier synchronization transition time, and radio frequency switch switching time, where the radio frequency circuit delay and the radio frequency switch switching time are a component fixed delay.

FIG. 1 is a schematic diagram of working principles of a TDD system in the prior art. As shown in FIGS. 1, A and B are two wireless TDD devices, and both of them have a TDD radio frequency switch and a synchronization module which performs carrier synchronization on a received signal. In a case that a valid data rate remains unchanged, flexibility of TDD timeslot assignment depends on the timeslot width, and the smaller the timeslot width is, the more flexible the assignment of upstream and downstream timeslots in the TDD system is. However, when a TDD timeslot width is reduced, and same a payload ratio needs to be kept, the timeslot guard interval needs to be reduced in equal proportion at the same time, that is, the carrier synchronization transition time needs to be reduced.

FIG. 2 is a schematic diagram of principles of a carrier synchronization process in the prior art. As shown in FIG. 2, in the prior art, a Costas loop is adopted to perform carrier synchronization, and two orthogonal local oscillation signals are adopted as feedback to be multiplied by a received two-phase shift keying (2PSK) signal, to obtain signals $v_3$ and $v_4$, respectively; the signals $v_3$ and $v_4$ undergo low-pass filtering in FIG. 2, to obtain signals $v_5$ and $v_6$, respectively. The signal $v_5$ is multiplied by the signal $v_6$ to obtain a signal $v_7$. Loop filtering is performed on the signal $v_7$ to obtain a carrier phase difference $\theta(t)$ between the local oscillation signals and the 2PSK signal. then a restored local oscillation signal, that is, a carrier signal, is obtained after processing performed by a voltage-controlled oscillator (VCO) in FIG. 2. The foregoing signal processing process needs to be performed for multiple times in carrier synchronization shown in FIG. 2, that is, the obtained carrier signal $v_1$ needs to be further fed back, and undergoes the foregoing processing process repeatedly, and finally, an accurate carrier signal can be restored, and the more the feedback times are, the more accurate the obtained carrier signal is.

However, a Costas loop carrier synchronization circuit in the prior art has long carrier synchronization transition time, and cannot be used in fast carrier restoration in burst communication.

SUMMARY OF THE INVENTION

An embodiment of the present invention provides a carrier synchronization method, circuit, and system, to reduce carrier synchronization transition time.

In a first aspect, an embodiment of the present invention provides a carrier synchronization method, including performing n times frequency multiplication on a received signal. Narrowband filtering is performed at least twice and rectangular wave shaping at least twice on the signal obtained after the n times frequency multiplication. Then the method performs n times frequency division on the signal obtained after the filtering and shaping, to restore a carrier signal. In this case, n is a positive integer greater than or equal to 4.

In another aspect, an embodiment of the present invention provides a carrier synchronization circuit. An n times frequency multiplication unit is configured to perform n times frequency multiplication on a received signal. A filtering and shaping unit is configured to perform narrowband filtering at least twice and rectangular wave shaping at least twice on the signal obtained after the n times frequency multiplication. An n times frequency division unit is configured to perform n times frequency division on the signal obtained after the filtering and shaping, to restore a carrier signal. In this case, n is a positive integer greater than or equal to 4.

In still another aspect, an embodiment of the present invention provides a carrier synchronization system. A demodulator and the carrier synchronization circuit are as described above. The demodulator is configured to receive a signal sent by a transmitting end and to demodulate the received signal according to a carrier signal obtained after phase shifting of a phase shifter.

Technical effects of the embodiments of the present invention can be described. n times frequency multiplication is performed on the received signal, the narrowband filtering and rectangular wave shaping are performed at least twice on the signal obtained after the n times frequency multiplication, and then the n times frequency division is performed on the signal obtained after the filtering and shaping, to restore the carrier signal, and implement carrier synchronization; in the embodiments of the present invention, signal feedback is not needed, and therefore, compared with the prior art, signal feedback time does not exist, thereby reducing carrier restoration transition time, and reducing a TDD timeslot width, so that in a case that it is ensured that TDD communication a payload ratio is unchanged, flexibility of TDD timeslot assignment is enhanced, and the carrier synchronization is applicable to carrier restoration in a TDD burst communication device.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without making creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without making creative efforts shall fall within the protection scope of the present invention.

Figure 1:
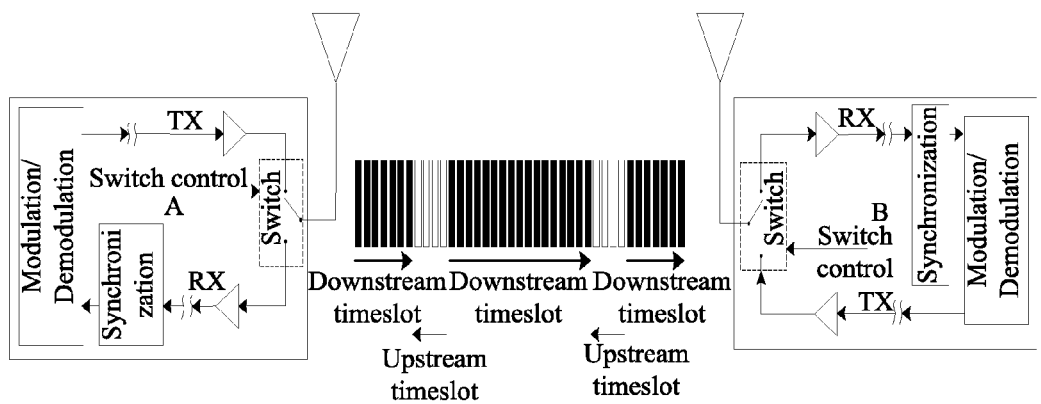
FIG. 1 is a schematic diagram of working principles of a TDD system in the prior art.
Figure 2:
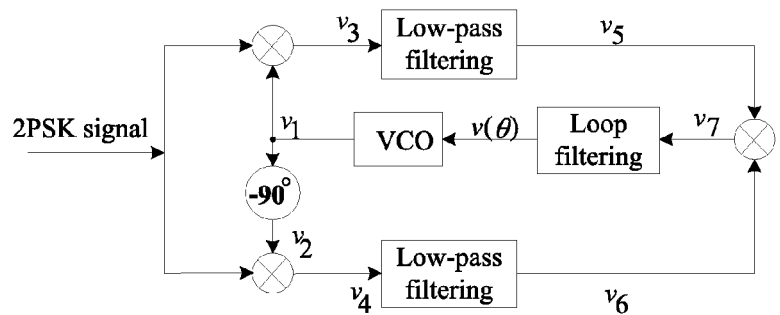
FIG. 2 is a schematic diagram of principles of a carrier synchronization process in the prior art.
Figure 3:
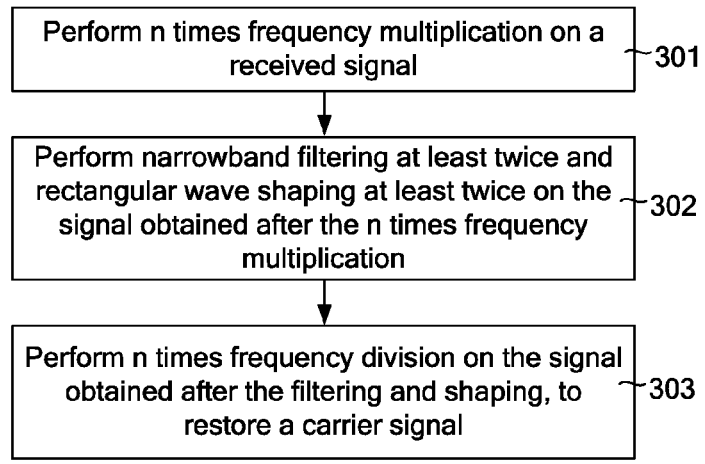
FIG. 3 is a flow chart of a first embodiment of a carrier synchronization method according to the present invention.

FIG. 3 is a flow chart of a first embodiment of a carrier synchronization method according to the present invention. As shown in FIG. 3, the embodiment provides the carrier synchronization method, which may specifically include the following steps.

Step 301: Perform n times frequency multiplication on a received signal.

Figure 4:
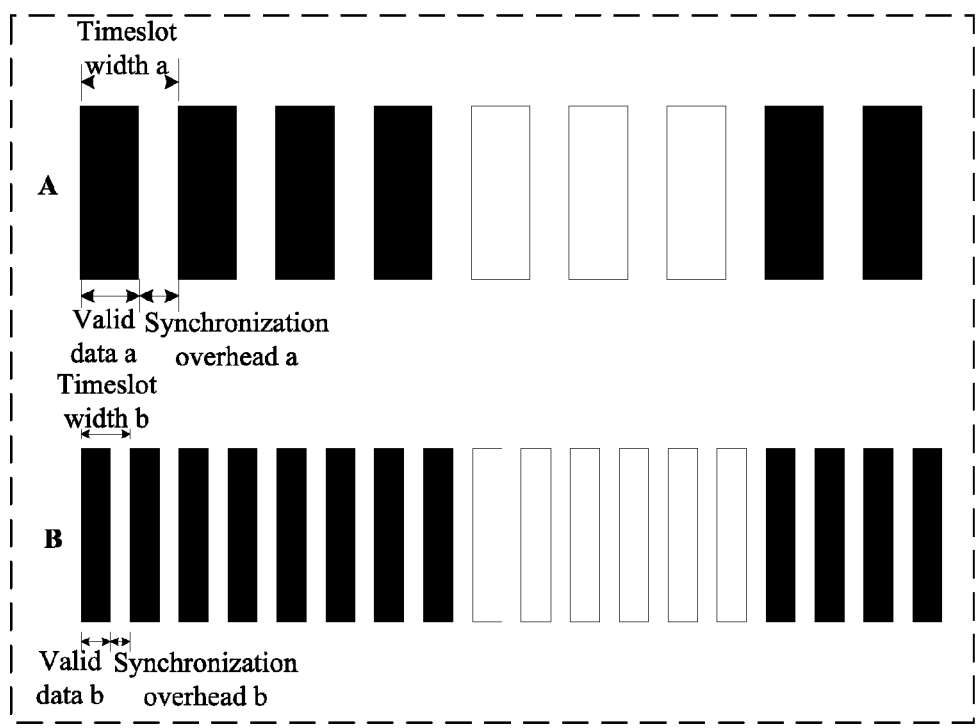
FIG. 4 is a schematic contrast diagram of a timeslot before and after adjustment in the first embodiment of the carrier synchronization method according to the present invention.

In the embodiment, in order to improve flexibility of upstream and downstream timeslot assignment in a TDD system, in a case that a payload ratio remains unchanged, a TDD timeslot width needs to be reduced. FIG. 4 is a schematic contrast diagram of a timeslot before and after adjustment in the first embodiment of the carrier synchronization method according to the present invention. As shown in FIG. 4, a TDD timeslot width a in a mode A is larger, and a TDD timeslot width b in a mode B is smaller, where the timeslot width a is formed by valid data a and a synchronization overhead a, and the timeslot width b is formed by valid data b and a synchronization overhead b. A payload ratio is equal to a ratio of valid data to a timeslot width, therefore it can be seen that, in order to keep a payload ratio before and after timeslot adjustment unchanged, when a timeslot width is reduced, a synchronization overhead needs to be reduced in equal proportion as the timeslot width at the same time. Therefore, carrier synchronization needs to be completed within relatively short time, that is, carrier synchronization transition time needs to be reduced.

The embodiment provides a carrier synchronization method, and the step is to first perform n times frequency multiplication on the received signal, where n is a positive integer greater than or equal to 4, that is, to perform 4 frequency multiplication, 6 frequency multiplication, or 8 frequency multiplication on the received signal. For quadrature phase shift keying (QPSK), the received signal in the step may be an intermediate frequency (IF) signal or a radio frequency signal in an analog form, and may specifically be a 2PSK signal or a quadrature amplitude modulation (QAM) signal, and the n times frequency multiplication may specifically be implemented by adopting an n-level analog multiplier.

Step 302: Perform narrowband filtering at least twice and rectangular wave shaping at least twice on the signal obtained after the n times frequency multiplication.

After n times frequency multiplication is performed on a received intermediate frequency signal, narrowband filtering and rectangular wave shaping are performed at least twice on the signal obtained after the n times frequency multiplication. Here, performing the narrowband filtering at least twice and performing the rectangular wave shaping at least twice specifically can be first performing narrowband filtering once, then performing rectangular wave shaping once, and then sequentially performing narrowband filtering once and rectangular wave shaping once. The rest may be deduced by analogy.

Rectangular wave shaping can be performed once after narrowband filtering each time. The center frequency of a narrowband filter is the center frequency of n times frequency multiplication of a carrier signal, so that the signal obtained after the n times frequency multiplication can be output as an n times frequency multiplication carrier after the signal undergoes the narrowband filtering. Then, rectangular wave shaping is performed on the n times frequency multiplication carrier obtained after the narrowband filtering is performed. The rectangular wave shaping in the embodiment may be implemented by adopting a comparator, and the n times frequency multiplication carrier is shaped into a square wave through the rectangular wave shaping, to obtain an n times frequency multiplication carrier in a rectangular wave form. In the embodiment, it is possible to perform narrowband filtering twice and rectangular wave shaping twice on the signal obtained after the n times frequency multiplication, and it is also possible to perform narrowband filtering three times and rectangular wave shaping three times on the signal obtained after the n times frequency multiplication. It is also possible to perform narrowband filtering more times and rectangular wave shaping more times, to restore a smoother carrier signal. Of course, the more the times of narrowband filtering and rectangular wave shaping are, the larger a delay brought may be, and the higher a cost is. Therefore, preferentially, narrowband filtering and rectangular wave shaping may be performed twice, or narrowband filtering and rectangular wave shaping may be performed three times.

Step 303: Perform n times frequency division on the signal obtained after the filtering and shaping, to restore a carrier signal.

After the narrowband filtering and the rectangular wave shaping are performed, the n times frequency division is further performed on the signal obtained after the filtering and shaping, that is, corresponding n times frequency division is performed on an n times frequency multiplication carrier signal, thereby finally restoring the carrier signal. It can be seen that, in the embodiment, signal feedback is not needed, and therefore, compared with a feedback carrier restoration method in the prior art, signal feedback time does not exist, thereby shortening whole response time, and reducing carrier restoration transition time.

It can be understood by persons of ordinary skill in the art that, because a signal received by a receiving end from a transmitting end is a modulated signal obtained after modulation is performed by the transmitting end by using the carrier signal before sending, and is not an original signal that the transmitting end actually intends to send. In order to accurately restore, at the receiving end, the original signal sent by the transmitting end, after the receiving end receives the modulated signal, the modulated signal needs to be demodulated by using the carrier used during the modulation, thereby obtaining the original signal. The embodiment is a process of restoring the carrier signal from the received signal, and after the receiving end restores the carrier used by the transmitting end, carrier synchronization between the receiving end and the transmitting end is implemented, and the receiving end may further obtain the original signal after restoration by using the carrier signal. Therefore, a carrier synchronization process in the embodiment is equivalent to a carrier restoration process.

The embodiment provides a carrier synchronization method. The n times frequency multiplication is performed on the received signal, the narrowband filtering and rectangular wave shaping are further performed at least twice on the signal obtained after the n times frequency multiplication, and then the n times frequency division is performed on the signal obtained after the filtering and shaping, thereby restoring the carrier signal, and implementing carrier synchronization. In the embodiment, signal feedback is not needed, and therefore, compared with the prior art, signal feedback time does not exist, thereby reducing carrier restoration transition time, and reducing a TDD timeslot width, so that in a case that it is ensured that TDD communication a payload ratio is unchanged, flexibility of TDD timeslot assignment is enhanced, and the carrier synchronization is applicable to carrier restoration in a TDD burst communication device.

Figure 5:
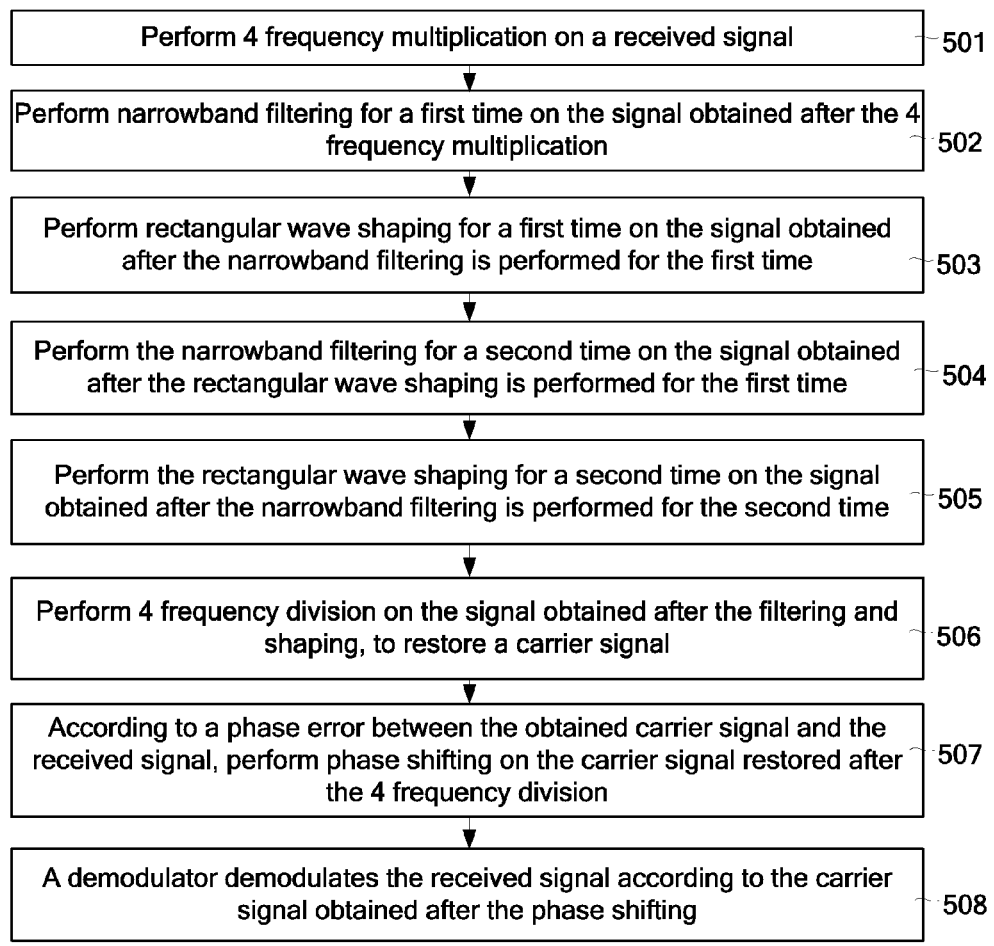
FIG. 5 is a flow chart of a second embodiment of a carrier synchronization method according to the present invention.

FIG. 5 is a flow chart of a second embodiment of a carrier synchronization method according to the present invention. As shown in FIG. 5, the embodiment provides the carrier synchronization method, which may specifically include the following steps.

Step 501: Perform 4 frequency multiplication on a received signal.

Figure 6:
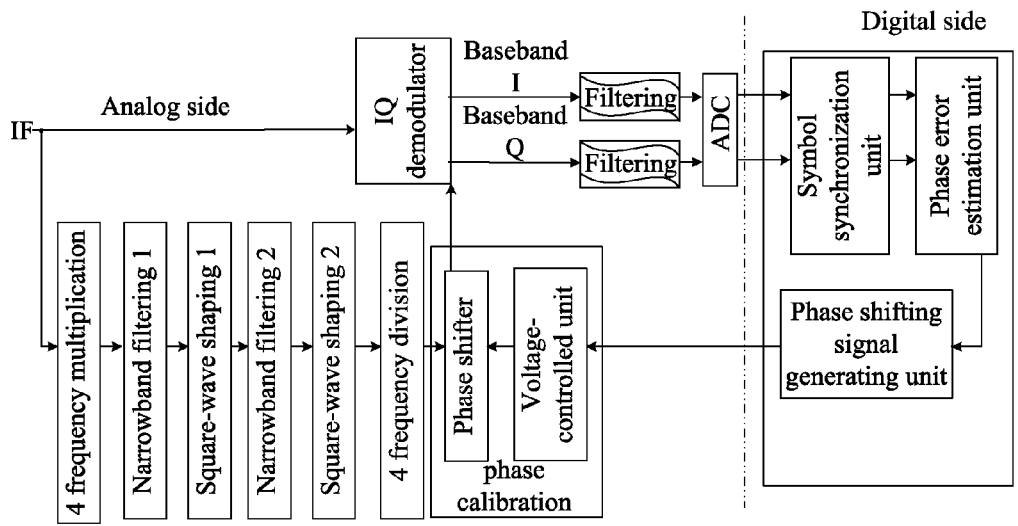
FIG. 6 is a schematic diagram of an application scenario of the second embodiment of the carrier synchronization method according to the present invention.
Figure 7A:
FIG. 7a is a schematic diagram of a whole waveform of a 4QAM envelope signal in the second embodiment of the carrier synchronization method according to the present invention.
Figure 7B:
FIG. 7b is a schematic magnification diagram of a partial waveform of the 4QAM envelope signal in the second embodiment of the carrier synchronization method according to the present invention.

FIG. 6 is a schematic diagram of an application scenario of the second embodiment of the carrier synchronization method according to the present invention. As shown in FIG. 6, in the embodiment, 4 frequency multiplication and 4 frequency division are specifically performed on the received signal, and filtering and shaping are performed twice. The IF signal received in the embodiment may specifically be a QAM signal, and after the 4 frequency multiplication in the step is performed, a waveform of the QAM signal changes to a 4QAM envelope signal; FIG. 7a is a schematic diagram of a whole waveform of a 4QAM envelope signal in the second embodiment of the carrier synchronization method according to the present invention, and FIG. 7b is a schematic magnification diagram of a partial waveform of the 4QAM envelope signal in the second embodiment of the carrier synchronization method according to the present invention.

Step 502: Perform narrowband filtering for a first time on the signal obtained after the 4 frequency multiplication.

Figure 8:
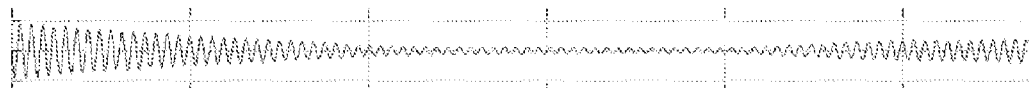
FIG. 8 is a schematic magnification diagram of a partial waveform of the signal obtained after narrowband filtering is performed for a first time in the second embodiment of the carrier synchronization method according to the present invention.

After the 4 frequency multiplication is performed on the QAM signal, the narrowband filtering is performed for the first time on the signal obtained after the 4 frequency multiplication, that is, narrowband filtering 1 in FIG. 6, and the center frequency of a narrowband filter for the first time is a center frequency of 4 times frequency multiplication of a carrier signal. FIG. 8 is a schematic magnification diagram of a partial waveform of the signal obtained after narrowband filtering is performed for a first time in the second embodiment of the carrier synchronization method according to the present invention. To show clearly, FIG. 8 is a signal waveform after being partially magnified, a 4 frequency multiplication carrier is obtained after the narrowband filtering, and the signal obtained after the narrowband filtering is performed for the first time is shown in FIG. 8.

Step 503: Perform rectangular wave shaping for a first time on the signal obtained after the narrowband filtering is performed for the first time.

Figure 9:
FIG. 9 is a schematic magnification diagram of a partial waveform of the signal obtained after rectangular wave shaping is performed for a first time in the second embodiment of the carrier synchronization method according to the present invention.

FIG. 9 is a schematic magnification diagram of a partial waveform of the signal obtained after rectangular wave shaping is performed for a first time in the second embodiment of the carrier synchronization method according to the present invention. To show clearly, FIG. 9 is a signal waveform after being partially magnified. After the narrowband filtering is performed for the first time on the 4QAM envelope signal, the rectangular wave shaping is performed for the first time on the signal obtained after the narrowband filtering is performed for the first time, that is, rectangular wave shaping 1 in FIG. 6, thereby obtaining a rectangular wave signal of the same amplitude, as shown in FIG. 9.

Step 504: Perform the narrowband filtering for a second time on the signal obtained after the rectangular wave shaping is performed for the first time.

After the filtering and shaping are performed for the first time on the QAM signal, because the envelope of the QAM signal is smooth, and signal amplitude is equal, and narrowband filtering is performed for another time after 4 frequency multiplication is performed on the signal, so that envelope fluctuation appears for an output signal of a filter, and an envelope close to zero even appears when some data sequences are transmitted, as shown in FIG. 8.

However, a dead zone exists for all shaping circuits, for example, a comparator needs to set a comparison threshold, the comparator outputs a high level when the envelope is higher than the threshold, and the comparator outputs a low level when the envelope is lower than the threshold. While if it is expected to output a high level after a signal is processed by the comparator, but the envelope is determined by the comparator as a low level, in this case, the dead zone appears. After the shaping is performed, a relatively large jitter on a phase of a frequency division signal is caused because a signal envelope enters the dead zone, that is, transient carrier pulse loss as shown in FIG. 9. Therefore, in the embodiment, the filtering and shaping need to be performed for the second time on the signal to eliminate a problem of carrier pulse loss.

The step is to perform the narrowband filtering for the second time on the signal obtained after the rectangular wave shaping is performed for the first time, that is, narrowband filtering 2 in FIG. 6, and because of inertia of an narrowband filter, even if after the first-time shaping, transient carrier pulse loss is caused because the signal envelope enters the dead zone, the envelope fluctuation may be reduced after the narrowband filtering is performed for the second time.

Figure 10:
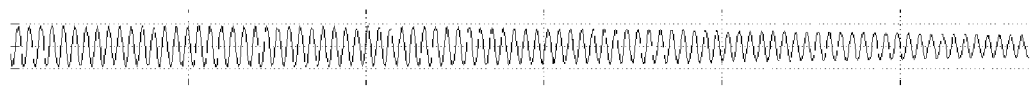
FIG. 10 is a schematic magnification diagram of a partial waveform of the signal obtained after the narrowband filtering is performed for a second time in the second embodiment of the carrier synchronization method according to the present invention.

FIG. 10 is a schematic magnification diagram of a partial waveform of the signal obtained after the narrowband filtering is performed for a second time in the second embodiment of the carrier synchronization method according to the present invention. To show clearly, FIG. 10 is a signal waveform after being partially magnified.

Step 505: Perform the rectangular wave shaping for a second time on the signal obtained after the narrowband filtering is performed for the second time.

Figure 11:
FIG. 11 is a schematic magnification diagram of a partial waveform of the signal obtained after the rectangular wave shaping is performed for a second time in the second embodiment of the carrier synchronization method according to the present invention.

FIG. 11 is a schematic magnification diagram of a partial waveform of the signal obtained after the rectangular wave shaping is performed for a second time in the second embodiment of the carrier synchronization method according to the present invention. To show clearly, FIG. 11 is a signal waveform after being partially magnified. After the narrowband filtering is performed for the second time on the 4QAM envelope signal, the rectangular wave shaping is performed for the second time on the signal obtained after the narrowband filtering is performed for the second time, that is, rectangular wave shaping 2 in FIG. 6, thereby obtaining a rectangular wave signal of the same amplitude, as shown in FIG. 11.

Step 506: Perform 4 frequency division on the signal obtained after the filtering and shaping, to restore a carrier signal.

After the foregoing filtering and shaping are performed twice on the QAM signal, the 4 frequency division is performed on the signal obtained after the filtering and shaping are performed twice, so as to restore the carrier signal.

Step 507: According to a phase error between the obtained carrier signal and the received signal, perform phase shifting on the carrier signal restored after the 4 frequency division.

The step is to perform phase calibration on the restored carrier signal, so as to eliminate the influence of a component delay. According to the phase error between the obtained carrier signal and the received signal, the phase shifting is performed on the foregoing carrier signal restored after the 4 frequency division. Here, the phase error may be configured manually. That is, the phase error is manually configured in a voltage-controlled unit in FIG. 6, a voltage of the voltage-controlled unit is adjusted, and phase shifting is performed on the carrier signal through a phase shifter. The phase error may also be obtained through estimation by using a demodulator algorithm.

Decision is performed on a phase error of an input signal through a phase error estimation unit in a demodulator. A decision error is first generated, and then the phase error may be obtained according to a signal after the phase decision, and the decision error. As shown in FIG. 6, the demodulated signal is sampled through an inphase and quadrature (IQ) demodulator, to obtain a baseband I signal and a baseband Q signal, and the signals undergo filtering and are input to an analog digital convertor (ADC). After the signals undergo analog digital conversion, the signals are synchronized to the local clock through a symbol synchronization unit. The phase error estimation unit performs phase decision on the input signals, and the phase error may be obtained according to the signal after the decision (that is, a standard QPSK signal), and the decision error. In FIG. 6, a voltage signal is further generated by a phase shifting signal generating unit by using the generated phase error, the voltage-controlled unit is controlled by using the voltage signal, and the phase error is input into the phase shifter.

Step 508: According to the carrier signal obtained after the phase shifting, the demodulator demodulates the received signal.

As shown in FIG. 6, after the 4 frequency multiplication, filtering and shaping twice, and 4 frequency division are performed on the QAM signal, the restored carrier signal is obtained. The demodulator further demodulates the received IF signal according to the carrier signal obtained after the foregoing phase shifting, that is, performs IQ demodulation on the QAM signal according to the restored carrier signal. Specifically, the carrier signal and the received signal may be demodulated through the demodulator; the demodulator may specifically be a multiplier, that is, the carrier signal is multiplied by the received signal, so that a demodulation process may be completed, and the demodulated signal may be obtained.

The embodiment provides the carrier synchronization method. The 4 frequency multiplication is performed on the received signal, the narrowband filtering and rectangular wave shaping are further performed twice on the signal obtained after the 4 frequency multiplication, and then the 4 frequency division is performed on the signal obtained after the filtering and shaping are performed twice, thereby restoring the carrier signal, and implementing the carrier synchronization; in the embodiment, signal feedback is not needed, and therefore, compared with the prior art, signal feedback time does not exist, thereby reducing carrier restoration transition time, and reducing a TDD timeslot width, so that in a case that it is ensured that TDD communication a payload ratio is unchanged, flexibility of TDD timeslot assignment is enhanced, and the carrier synchronization is applicable to carrier restoration in a TDD burst communication device.

Figure 12:
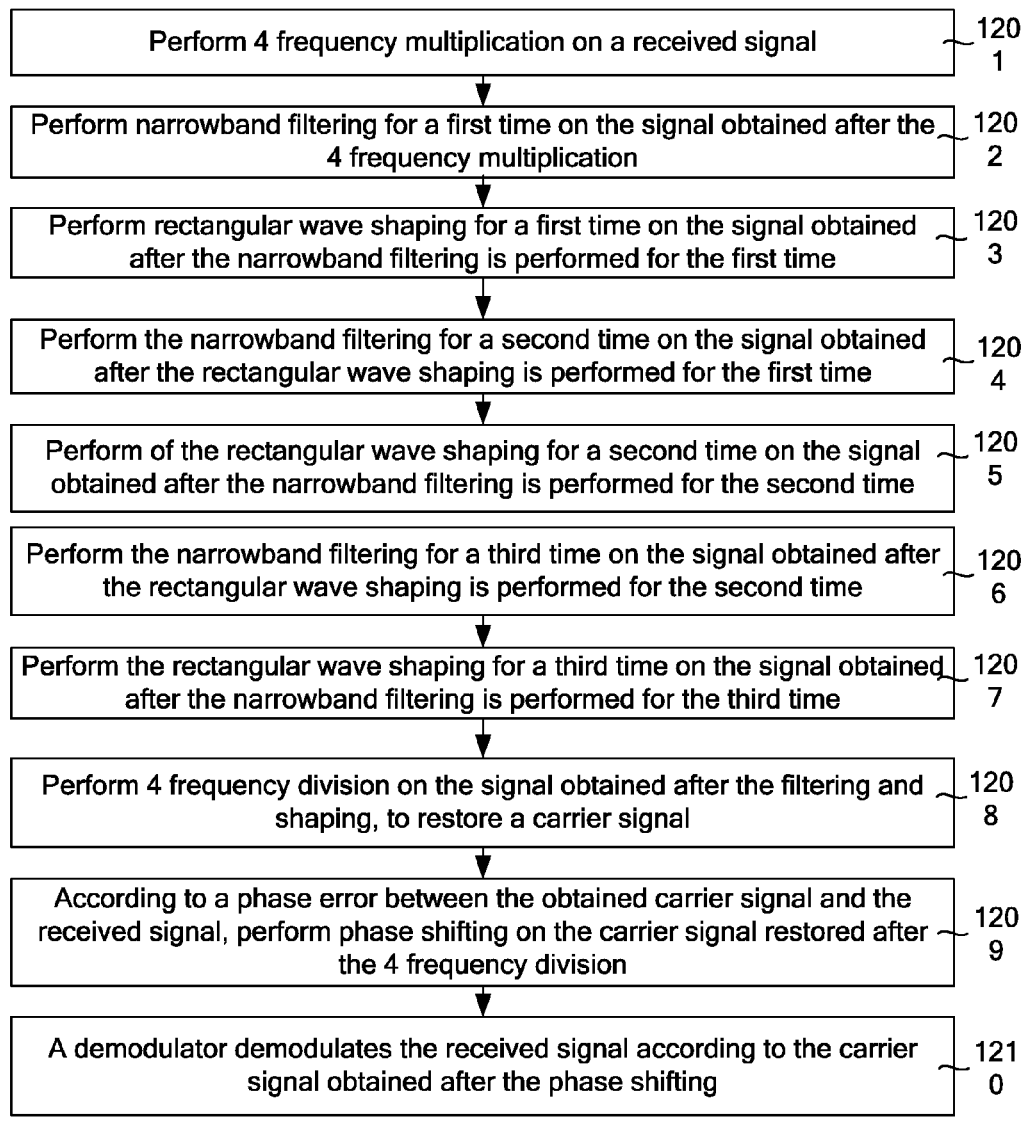
FIG. 12 is a flow chart of a third embodiment of a carrier synchronization method according to the present invention.

FIG. 12 is a flow chart of a third embodiment of a carrier synchronization method according to the present invention. As shown in FIG. 12, the embodiment provides the carrier synchronization method, which may specifically include the following steps.

Step 1201: Perform 4 frequency multiplication on a received signal.

Step 1202: Perform narrowband filtering for a first time on the signal obtained after the 4 frequency multiplication.

Step 1203: Perform rectangular wave shaping for a first time on the signal obtained after the narrowband filtering is performed for the first time.

Step 1204: Perform the narrowband filtering for a second time on the signal obtained after the rectangular wave shaping is performed for the first time.

Step 1205: Perform the rectangular wave shaping for a second time on the signal obtained after the narrowband filtering is performed for the second time.

The foregoing steps 1201 to 1205 in the embodiment may be similar to steps 501 to 505 in the foregoing second embodiment, respectively, which are not repeatedly described here.

Step 1206: Perform the narrowband filtering for a third time on the signal obtained after the rectangular wave shaping is performed for the second time.

On the basis of the foregoing second embodiment, in the embodiment, the narrowband filtering and rectangular wave shaping are further performed once on the signal obtained after the rectangular wave shaping is performed for the second time. That is, the step is specifically to perform the narrowband filtering for the third time on the signal obtained after the rectangular wave shaping is performed for the second time, and a more stable n times frequency multiplication carrier is obtained after the narrowband filtering is performed for the third time. The more the times of narrowband filtering are, the better the stability of amplitude of the obtained n times frequency multiplication carrier is, and of course, the increase of a delay is caused accordingly. Therefore, it is generally possible to perform filtering and shaping twice or three times on the signal.

Step 1207: Perform the rectangular wave shaping for a third time on the signal obtained after the narrowband filtering is performed for the third time.

After the narrowband filtering is performed for the third time, in the embodiment, the rectangular wave shaping is further performed for the third time on the signal obtained after the narrowband filtering is performed for the third time. Compared with the second embodiment, in the embodiment, the narrowband filtering and rectangular wave shaping are performed for a third time, and by performing the narrowband filtering and rectangular wave shaping three times, a signal, such as noise, existing in the carrier may be better eliminated, so that a restored carrier signal is more stable, and accuracy of carrier synchronization is improved.

Step 1208: Perform 4 frequency division on the signal obtained after the filtering and shaping, to restore a carrier signal.

Step 1209: According to a phase error between the obtained carrier signal and the received signal, perform phase shifting on the carrier signal restored after the 4 frequency division.

Step 1210: According to the carrier signal obtained after the phase shifting, a demodulator demodulates the received signal.

The foregoing steps 1208 to 1210 in the embodiment may be similar to steps 506 to 508 in the foregoing second embodiment, respectively, which are not repeatedly described here.

The embodiment provides the carrier synchronization method. The 4 frequency multiplication is performed on the received signal, the narrowband filtering and rectangular wave shaping are further performed three times on the signal obtained after the 4 frequency multiplication, and then the 4 frequency division is performed on the signal obtained after the filtering and shaping are performed three times, thereby restoring the carrier signal, and implementing carrier synchronization. In the embodiment, signal feedback is not needed, and therefore, compared with the prior art, signal feedback time does not exist, thereby reducing carrier restoration transition time, and reducing a TDD timeslot width, so that in a case that it is ensured that TDD communication a payload ratio is unchanged, flexibility of TDD timeslot assignment is enhanced, and the carrier synchronization is applicable to carrier restoration in a TDD burst communication device; and in the embodiment, accuracy and stability of the carrier synchronization are improved.

Persons of ordinary skill in the art should understand that all or part of the steps of the foregoing method embodiments may be implemented by a program instructing relevant hardware. The foregoing program may be stored in a computer readable storage medium. When the program is executed, the steps of the foregoing method embodiments are performed. The foregoing storage medium includes any medium that is capable of storing program codes, such as a ROM, a RAM, a magnetic disk, or a compact disk.

Figure 13:
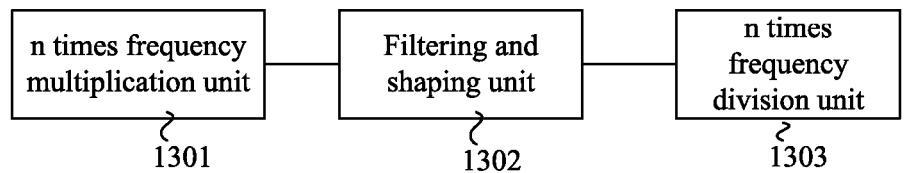
FIG. 13 is a schematic structural diagram of a first embodiment of a carrier synchronization circuit according to the present invention.

FIG. 13 is a schematic structural diagram of a first embodiment of a carrier synchronization circuit according to the present invention. As shown in FIG. 13, the embodiment provides the carrier synchronization circuit which may specifically perform each step in the foregoing first method embodiment, and details are not repeatedly described here. The carrier synchronization circuit provided in the embodiment may specifically include an n times frequency multiplication unit 1301, a filtering and shaping unit 1302, and an n times frequency division unit 1303. The n times frequency multiplication unit 1301 is configured to perform n times frequency multiplication on a received signal. The filtering and shaping unit 1302 is configured to perform narrowband filtering at least twice and rectangular wave shaping at least twice on the signal obtained after the n times frequency multiplication. The n times frequency division unit 1303 is configured to perform n times frequency division on the signal obtained after the filtering and shaping, to restore a carrier signal, where n is a positive integer greater than or equal to 4.

Figure 14:
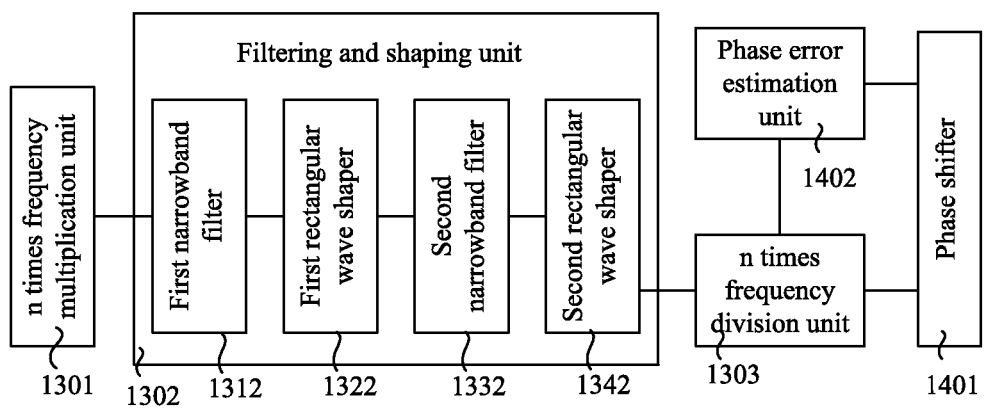
FIG. 14 is a schematic structural diagram of a second embodiment of a carrier synchronization circuit according to the present invention.

FIG. 14 is a schematic structural diagram of a second embodiment of a carrier synchronization circuit according to the present invention. As shown in FIG. 14, the embodiment provides the carrier synchronization circuit which may specifically perform each step in the foregoing second method embodiment, and details are not repeatedly described here. The carrier synchronization circuit provided in the embodiment is based on the foregoing FIG. 13, and the filtering and shaping unit 1302 may specifically include a first narrowband filter 1312, a first rectangular wave shaper 1322, a second narrowband filter 1332, and a second rectangular wave shaper 1342. The first narrowband filter 1312 is configured to perform narrowband filtering for a first time on the signal obtained after the n times frequency multiplication. The first rectangular wave shaper 1322 is configured to perform rectangular wave shaping for a first time on the signal obtained after the narrowband filtering is performed for the first time. The second narrowband filter 1332 is configured to perform the narrowband filtering for a second time on the signal obtained after the rectangular wave shaping is performed for the first time. The second rectangular wave shaper 1342 is configured to perform the rectangular wave shaping for a second time on the signal obtained after the narrowband filtering is performed for the second time.

Further, the carrier synchronization circuit provided in the embodiment may further include a phase shifter 1401. The phase shifter 1401 is configured to: according to a phase error between the obtained carrier signal and the received signal, perform phase shifting on the carrier signal obtained after the n times frequency division, so that a demodulator demodulates the received signal according to the carrier signal obtained after the phase shifting.

Furthermore, the carrier synchronization circuit provided in the embodiment may further include a phase error estimation unit 1402. The phase error estimation unit 1402 is configured to perform phase decision on the signal obtained after the demodulation, generate a decision error, and generate the phase error between the carrier signal and the received signal according to the signal obtained after the phase decision, and the decision error.

Figure 15:
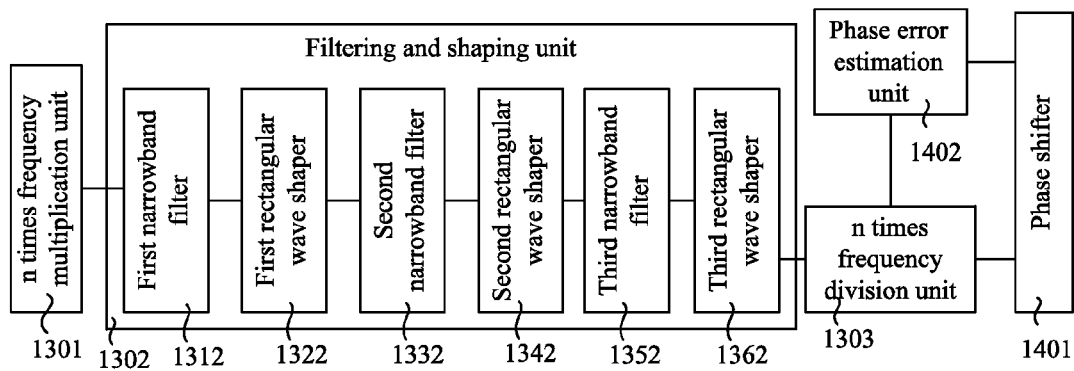
FIG. 15 is a schematic structural diagram of a third embodiment of a carrier synchronization circuit according to the present invention.

FIG. 15 is a schematic structural diagram of a third embodiment of a carrier synchronization circuit according to the present invention. As shown in FIG. 15, the embodiment provides the carrier synchronization circuit which may specifically perform each step in the foregoing third method embodiment, and details are not repeatedly described here. The carrier synchronization circuit provided in the embodiment is based on the foregoing FIG. 14, and the filtering and shaping unit 1302 may further include a third narrowband filter 1352 and a third rectangular wave shaper 1362. The third narrowband filter 1352 is configured to perform the narrowband filtering for a third time on the signal obtained after the rectangular wave shaping is performed for the second time. The third rectangular wave shaper 1362 is configured to perform the rectangular wave shaping for a third time on the signal obtained after the narrowband filtering is performed for the third time.

The embodiment provides the carrier synchronization circuit. The n times frequency multiplication is performed on the received signal, the narrowband filtering and rectangular wave shaping are further performed at least twice on the signal obtained after the n times frequency multiplication, and then the n times frequency division is performed on the signal obtained after the filtering and shaping are performed at least twice, thereby restoring the carrier signal, and implementing carrier synchronization; in the embodiment, compared with the prior art, carrier restoration transition time is reduced, and a TDD timeslot width is reduced, so that in a case that it is ensured that TDD communication a payload ratio is unchanged, flexibility of TDD timeslot assignment is enhanced, and the carrier synchronization is applicable to carrier restoration in a TDD burst communication device.

An embodiment of the present invention further provides a carrier synchronization system, and the carrier synchronization system may specifically include a demodulator and the carrier synchronization circuit shown in the foregoing FIG. 13, FIG. 14, or FIG. 15. The demodulator may be configured to receive a signal sent by a transmitting end, and demodulate the received signal according to a carrier signal obtained after phase shifting of a phase shifter.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions recorded in the foregoing embodiments, or make equivalent substitutions to part or all of the technical features of the technical solutions thereof, and such modifications or substitutions cannot make the essence of the corresponding technical solutions depart from the scope of the technical solutions of the embodiments of the present invention.

What is claimed is:

1. A carrier synchronization method for restoring carrier signals, comprising:
    performing, by a receiving end, n times frequency multiplication on a received signal, wherein n is a positive integer greater than or equal to 4, and wherein the received signal comprises a carrier signal and a transmitted signal, and the carrier signal is a waveform that is modulated with the transmitted signal;
    performing, by the receiving end, narrowband filtering for a first time on a signal obtained after the n times frequency multiplication has been performed;
    performing, by the receiving end, rectangular wave shaping for a first time on a signal obtained after the narrowband filtering is performed for the first time;
    performing, by the receiving end, the narrowband filtering for a second time on a signal obtained after the rectangular wave shaping is performed for the first time;
    performing, by the receiving end, the rectangular wave shaping for a second time on a signal obtained after the narrowband filtering is performed for the second time; and
    performing, by the receiving end, n times frequency division on a signal obtained after the rectangular wave shaping is performed for the second time to restore the carrier signal, whereby generating a restored carrier signal.

2. The method according to claim 1, wherein one of the narrowband filtering and the rectangular wave shaping is performed at least three times.

3. The method according to claim 1, wherein after performing the rectangular wave shaping for the second time, the method further comprises:
    performing the narrowband filtering for a third time on the signal obtained after the rectangular wave shaping is performed for the second time; and
    performing the rectangular wave shaping for a third time on the signal obtained after the narrowband filtering is performed for the third time.

4. The method according to claim 1, further comprising performing phase shifting on the restored carrier signal according to a phase error between the restored carrier signal and the received signal, so that a demodulator demodulates the received signal according to the carrier signal obtained after the phase shifting.

5. The method according to claim 4, further comprising:
    performing a phase decision on a signal obtained after the demodulation;
    generating a decision error; and
    generating a phase error between the restored carrier signal and the received signal according to the signal obtained after the phase decision and the decision error.

6. A carrier synchronization circuit, comprising:
a receiver, configured to receive a signal from a transmitting circuit, wherein the received signal comprises a carrier signal and a transmitted signal, and the carrier signal is a waveform that is modulated with the transmitted signal, and wherein the carrier synchronization circuit is configured to restore the carrier signal from the received signal;
a multiplier coupled to the receiver, configured to perform n times frequency multiplication on the received signal, wherein n is a positive integer greater than or equal to 4;
a filtering and shaping circuit, configured to perform narrowband filtering for a first time on a signal obtained after the n times frequency multiplication has been performed, perform rectangular wave shaping for a first time on a signal obtained after the narrowband filtering is performed for the first time, perform the narrowband filtering for a second time on a signal obtained after the rectangular wave shaping is performed for the first time, and perform the rectangular wave shaping for a second time on a signal obtained after the narrowband filtering is performed for the second time; and
an n times frequency division circuit coupled to the filtering and shaping circuit, configured to perform n times frequency division on a signal output from the filtering and shaping circuit to generate a restored carrier signal.

7. The circuit according to claim 6, wherein the filtering and shaping circuit comprises:
a first narrowband filter, configured to perform the narrowband filtering for the first time on the signal obtained after the n times frequency multiplication;
a first rectangular wave shaper, configured to perform the rectangular wave shaping for the first time on the signal obtained after the narrowband filtering is performed for the first time;
a second narrowband filter, configured to perform the narrowband filtering for the second time on the signal obtained after the rectangular wave shaping is performed for the first time; and
a second rectangular wave shaper, configured to perform the rectangular wave shaping for the second time on the signal obtained after the narrowband filtering is performed for the second time.

8. The circuit according to claim 7, wherein the filtering and shaping circuit further comprises:
a third narrowband filter, configured to perform the narrowband filtering for a third time on the signal obtained after the rectangular wave shaping is performed for the second time; and
a third rectangular wave shaper, configured to perform the rectangular wave shaping for a third time on the signal obtained after the narrowband filtering is performed for the third time.

9. The circuit according to claim 6, further comprising a phase shifter, configured to, according to a phase error between the restored carrier signal and the received signal, perform phase shifting on the restored carrier signal obtained after the n times frequency division, so that a demodulator demodulates the received signal according to the carrier signal obtained after the phase shifting.

10. The circuit according to claim 9, further comprising a phase error estimation circuit, configured to perform phase decision on a signal obtained after the demodulation, to generate a decision error, and to generate a phase error between the restored carrier signal and the received signal according to the signal obtained after the phase decision, and the decision error.

11. A carrier synchronization system, comprising:
a receiver, configured to receive a signal from a transmitting end, the signal being wirelessly transmitted from the transmitting end, wherein the received signal comprises a carrier signal and a transmitted signal, and the carrier signal is a waveform that is modulated with the transmitted signal;
a demodulator; and
a carrier synchronization circuit configured to restore the carrier signal from the received signal;
wherein the carrier synchronization circuit, comprises:
a multiplier, configured to perform n times frequency multiplication on the received signal, wherein n is a positive integer greater than or equal to 4;
a filtering and shaping circuit coupled to the multiplier, configured to perform narrowband filtering for a first time on a signal obtained after the n times frequency multiplication has been performed, perform rectangular wave shaping for a first time on a signal obtained after the narrowband filtering is performed for the first time, perform the narrowband filtering for a second time on a signal obtained after the rectangular wave shaping is performed for the first time, and perform the rectangular wave shaping for a second time on a signal obtained after the narrowband filtering is performed for the second time; and
an n times frequency division circuit coupled to the filtering and shaping circuit, configured to perform n times frequency division on a signal output from the filtering and shaping circuit and generate a restored carrier signal; and
wherein the demodulator is configured to demodulate the received signal according to a carrier signal obtained after phase shifting of the restored carrier signal performed by a phase shifter.

12. The circuit according to claim 11, wherein the filtering and shaping circuit comprises:
a first narrowband filter, configured to perform the narrowband filtering for the first time on the signal obtained after the n times frequency multiplication;
a first rectangular wave shaper, configured to perform the rectangular wave shaping for the first time on the signal obtained after the narrowband filtering is performed for the first time;
a second narrowband filter, configured to perform the narrowband filtering for the second time on the signal obtained after the rectangular wave shaping is performed for the first time; and
a second rectangular wave shaper, configured to perform the rectangular wave shaping for the second time on the signal obtained after the narrowband filtering is performed for the second time.

13. The circuit according to claim 12, wherein the filtering and shaping circuit further comprises:
a third narrowband filter, configured to perform the narrowband filtering for a third time on the signal obtained after the rectangular wave shaping is performed for the second time; and
a third rectangular wave shaper, configured to perform the rectangular wave shaping for a third time on the signal obtained after the narrowband filtering is performed for the third time.

14. The circuit according to claim 11, further comprising the phase shifter, configured to, according to a phase error between the restored carrier signal and the received signal, perform the phase shifting on the restored carrier signal, so that the demodulator demodulates the received signal according to the phase-shifted restored carrier signal obtained after the phase shifting.

15. The circuit according to claim 14, further comprising a phase error estimation circuit, configured to perform phase decision on the signal obtained after the demodulation, to generate a decision error, and to generate a phase error between the restored carrier signal and the received signal according to the signal obtained after the phase decision, and the decision error.

16. The carrier synchronization method according to claim 1,
    wherein the received signal is wirelessly transmitted by a transmitting end using a wireless network.

\* \* \* \* \*